(12) United States Patent
Li et al.

(10) Patent No.: US 12,549,767 B2
(45) Date of Patent: Feb. 10, 2026

(54) GEOMETRIC TRANSFORMATIONS FOR VIDEO COMPRESSION

(71) Applicant: GOOGLE LLC, Mountain View, CA (US)

(72) Inventors: Bohan Li, Santa Clara, CA (US); Debargha Mukherjee, Cupertino, CA (US); Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/635,323

(22) Filed: Apr. 15, 2024

(65) Prior Publication Data

US 2024/0380924 A1    Nov. 14, 2024

Related U.S. Application Data

(60) Provisional application No. 63/465,064, filed on May 9, 2023.

(51) Int. Cl.
*H04N 19/60* (2014.01)
*H04N 19/159* (2014.01)
*H04N 19/176* (2014.01)
*H04N 19/70* (2014.01)

(52) U.S. Cl.
CPC .......... *H04N 19/60* (2014.11); *H04N 19/159* (2014.11); *H04N 19/176* (2014.11); *H04N 19/70* (2014.11)

(58) Field of Classification Search
CPC .... H04N 19/60; H04N 19/159; H04N 19/176; H04N 19/70; H04N 19/593
See application file for complete search history.

(56) References Cited

U.S. PATENT DOCUMENTS

| | | | |
|---|---|---|---|
| 11,683,511 B2 * | 6/2023 | Koo | H04N 19/61 375/240 |
| 11,736,727 B2 * | 8/2023 | Rusanovskyy | H04N 19/60 375/240.03 |
| 12,309,433 B2 * | 5/2025 | Li | H04N 19/82 |

OTHER PUBLICATIONS

Ali, M., Papadopoulos, C., and Clarkson, T. G., "The Use of Fractal Theory in a Video Compression System", Proc. IEEE Data Compression Conference (DCC'92), Mar. 24-27, 1992, Snowbird, Utah, eds. James A. Storer and Martin A. Cohn, IEEE Comp. Soc. Press, 1992, p. 259-268. (Year: 1992).*

* cited by examiner

*Primary Examiner* — Justin W Rider
(74) *Attorney, Agent, or Firm* — Young Basile Hanlon & MacFarlane, P.C.

(57) ABSTRACT

Decoding a current block of a current frame includes decoding, from a compressed bitstream, one or more syntax elements indicating that a geometric transformation is to be applied; applying the geometric transformation to at least a portion of the current frame to obtain a transformed portion; and obtaining a prediction of the current block based on the transformed portion and an intra-prediction mode.

20 Claims, 10 Drawing Sheets

FIG. 7

GEOMETRIC TRANSFORMATIONS FOR VIDEO COMPRESSION

CROSS REFERENCE TO RELATED APPLICATION

This application claims the benefit of and priority to U.S. Provisional Patent Application Ser. No. 63/465,064, filed May 9, 2023, the entire disclosure of which is incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other coding techniques. These techniques may include both lossy and lossless coding techniques.

SUMMARY

This disclosure relates generally to encoding and decoding video data and more particularly relates to applying geometric transformations prior to prediction.

A first general aspect includes a method for decoding a current block of a current frame. The method includes decoding, from a compressed bitstream, one or more syntax elements indicating that a geometric transformation is to be applied. The method also includes applying the geometric transformation to at least a portion of the current frame to obtain a transformed portion. The method also includes obtaining a prediction of the current block based on the transformed portion and an intra-prediction mode. Other embodiments of this aspect include corresponding computer systems, apparatus, and computer programs recorded on one or more computer storage devices, each configured to perform the actions of the methods.

A second general aspect includes a method for encoding a current block of a current frame. The method includes determining that the current block is to be encoded based on a geometric transformation. The method also includes encoding, in a compressed bitstream, one or more syntax elements indicating the geometric transformation. The method also includes applying the geometric transformation to at least a portion of the current frame that includes the current block to obtain a transformed portion. The method also includes obtaining a prediction block for the current block based on the transformed portion and an intra-prediction mode. Other embodiments of this aspect include corresponding computer systems, apparatus, and computer programs recorded on one or more computer storage devices, each configured to perform the actions of the methods.

A third general aspect includes a device that includes a processor that is configured to execute instructions to code a current block of a current frame. The instructions include instructions to code one or more syntax elements indicating that a geometric transformation is to be applied; apply the geometric transformation to at least a portion of the current frame to obtain a transformed portion; and obtain a prediction of the current block based on the transformed portion and an intra-prediction mode.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. For example, a non-transitory computer-readable storage medium may include executable instructions that, when executed by a processor, facilitate performance of operations operable to cause the processor to carry out any of the methods described herein. Aspects can be combined such that features described in the context of one aspect may be implemented in another aspect.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings described below wherein like reference numerals refer to like parts throughout the several views.

FIG. 7 is an illustration of using a geometric transformation to obtain a prediction of a block.

DETAILED DESCRIPTION

Figure 1:
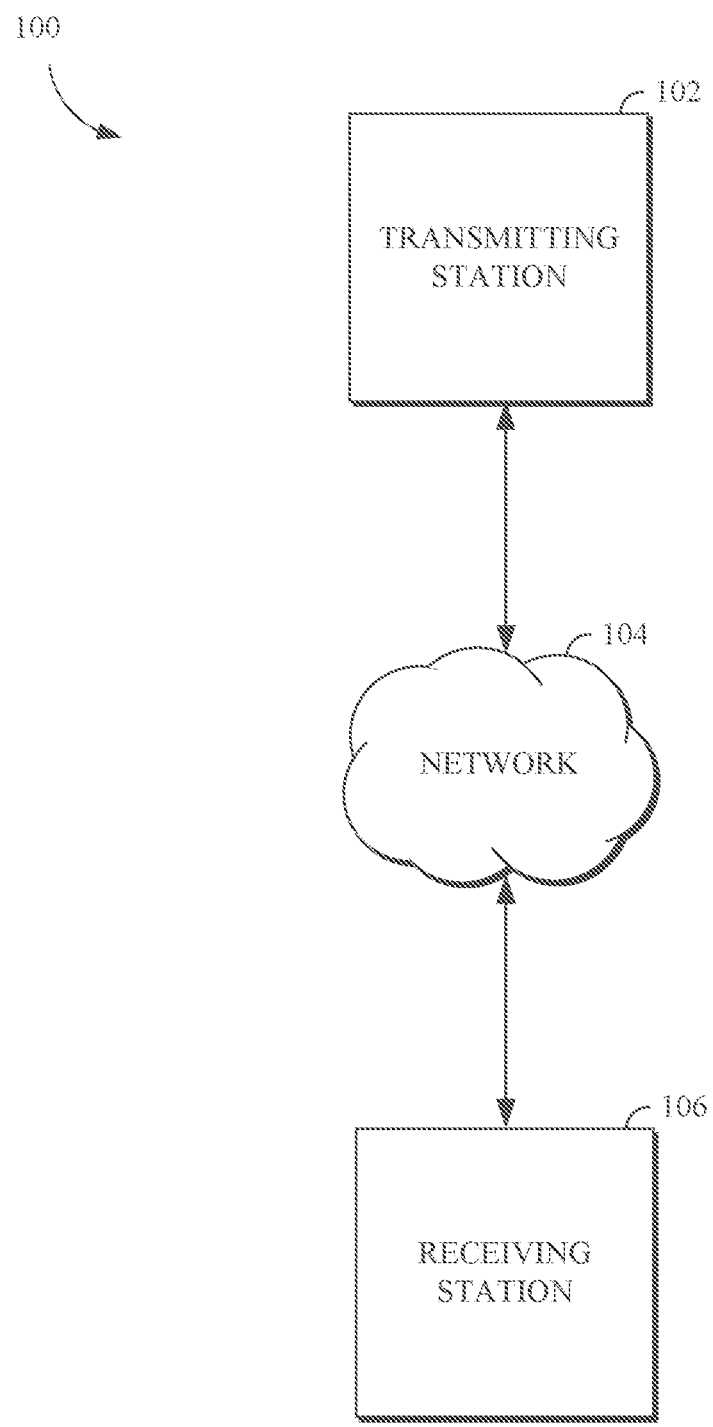
FIG. 1 is a schematic of a video encoding and decoding system.

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Encoding or decoding a video block can include predicting motion within that video block, such as with respect to one or more other video blocks in the same video frame or in a different video frame. Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of a video stream using pixels peripheral to the block; that is, using pixels that are in the same frame as the block but that are outside the block. Intra prediction can be performed along a direction of prediction where each direction can correspond to an intra prediction mode. The intra prediction mode can be signaled by an encoder to a decoder. A prediction block resulting from intra prediction is referred to herein as intra predictor.

Traditionally, video coding may rely on the assumptions that the problems at hand are "not too far" from the simple ideal case. Therefore simple techniques may be used to solve the problems. This results from a combination of practical constraints in calculation complexity or processing pipelines, as well as the difficulty in designing complicated models. In the case of intra-prediction, at least the following potential problems may arise.

Due to the coding order of blocks (e.g., raster scan order), at least certain intra prediction directions may not be as effective as others and/or the available intra-prediction modes may not include modes that could make use of the optimal reference pixels. To illustrate, when encoding from left to right and top to bottom, directional intra-prediction modes that are from upper-right to the lower-left may result in a large distance between the reference pixels and the current block, as illustrated with respect to FIG. 8. Thus, compression efficiency may suffer if a video sequence contains many patterns of such or similar directions (i.e., patterns that would necessitate the use of directional intra-prediction modes that use reference pixels that are physically distant from the pixels to be predicted).

In some situations, straight lines may be captured in a video sequence as non-straight lines. This may be due to slight camera lens distortions. Thus, when a video sequence includes such patterns of non-straight lines, intra-prediction modes, which use or assume that lines are straight, may result in suboptimal compression efficiency.

Furthermore, when partitioning a frame into blocks, it is preferable that the partitioning is such that pixels that belong to a same object (so they share similar statistics) into one block. However, when a boundary of the object is not rectilinear (e.g., square or rectangular), it may not be possible to include the object in a block that is according to traditional partitioning (e.g., into rectilinear shapes).

Implementations according to this disclosure solve problems such as these by applying an invertible geometric transformation to at least a portion of a video frame to be coded. The geometric transformation can be applied before coding the portion of the video frame. An inverse geometric transformation (i.e., a geometric transformation that reverses the geometric transformation) may be applied after a reconstruction so that the frame can be displayed. The geometric transformation can be applied to an entire frame or a portion thereof. The portion can be a tile or row of blocks. Inverse geometric transformation can be applied subsequent to (e.g., immediately after) reconstructing the affected portion. When predicting a transformed block, the reference pixels used to obtain the prediction also undergo the same transformation. Applying geometric transformations prior to prediction can include decoding, from a compressed bitstream, one or more syntax elements indicating that a geometric transformation is to be applied. The geometric transformation can be applied to at least a portion of the current frame to obtain a transformed portion. A prediction of the current block can be obtained based on the transformed portion and an intra-prediction mode. After the current block is reconstructed or after the frame is reconstructed, the inverse geometric transformation is applied.

The geometric transformation can be selected based on characteristics of the at least the portion of a video frame. That is, the selection of the geometric transformation to be applied can depend on the specific problem. For example, to improve the intra prediction direction, a reflection or a rotation geometric transformation may be applied to the portion of the frame. For example, a geometric transformation may be applied to straighten lines in the presence of camera distortions therewith improving intra prediction or partitioning efficiency.

While the disclosure herein is mostly described with respect to intra-prediction, as a person skilled in the art can appreciate, the disclosure herein can be adapted to apply to inter-prediction. For example, in the case that a current block is to be inter-predicted, a reference frame may be transformed as described herein prior to obtaining a prediction block. For example, the encoder may encode and a decoder may decode that a motion vector of the current block points to a geometrically transformed reference block. As such, the decoder may, after decoding the motion vector, perform a geometric transformation on at least a portion of the reference frame prior to predicting the current block based on the motion vector.

Further details of applying geometric transformations prior to prediction are described herein with initial reference to a system in which it can be implemented. FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
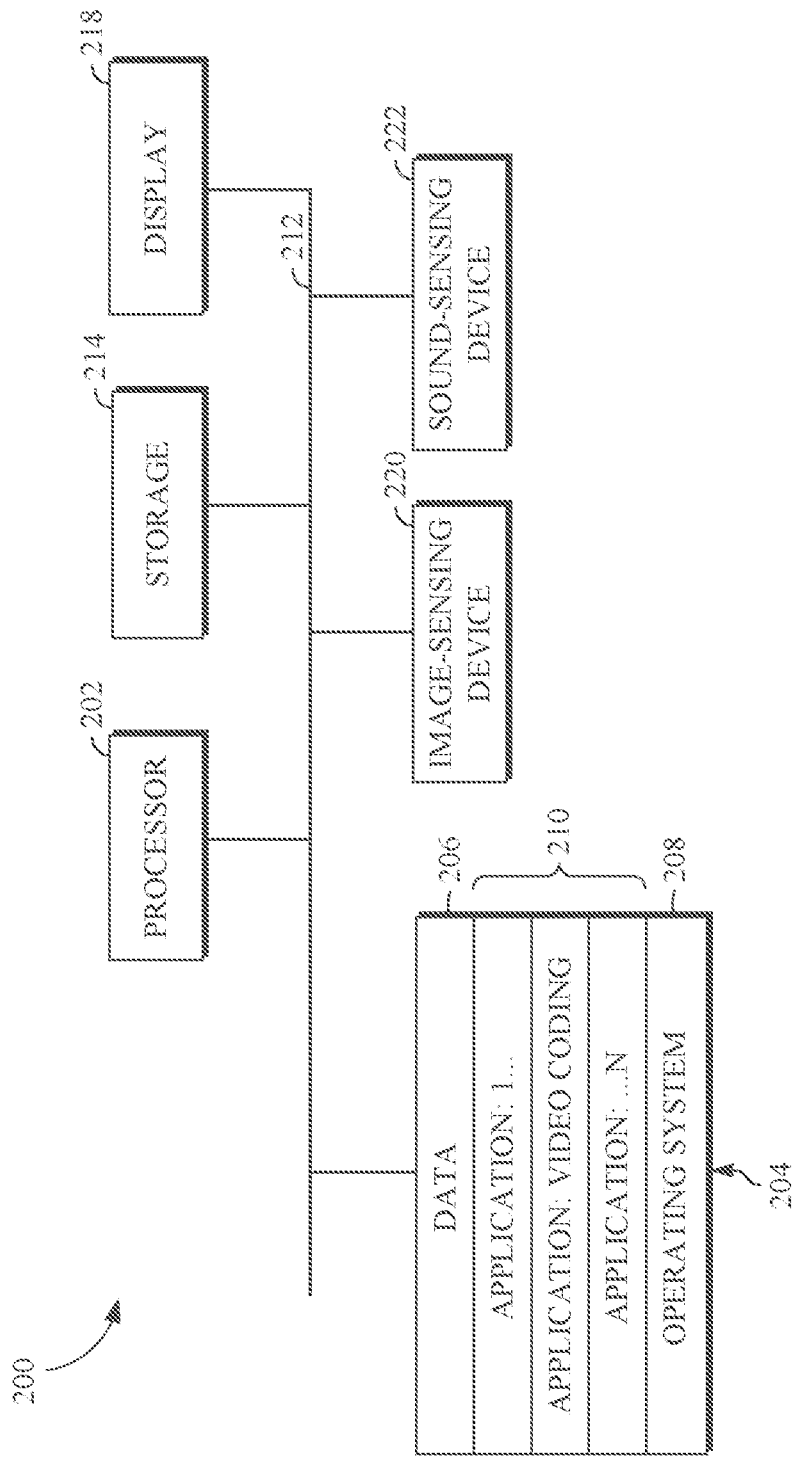
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 (e.g., an apparatus) that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include video coding applications that perform geometric transformations for video compression and/or that perform any other methods described herein. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
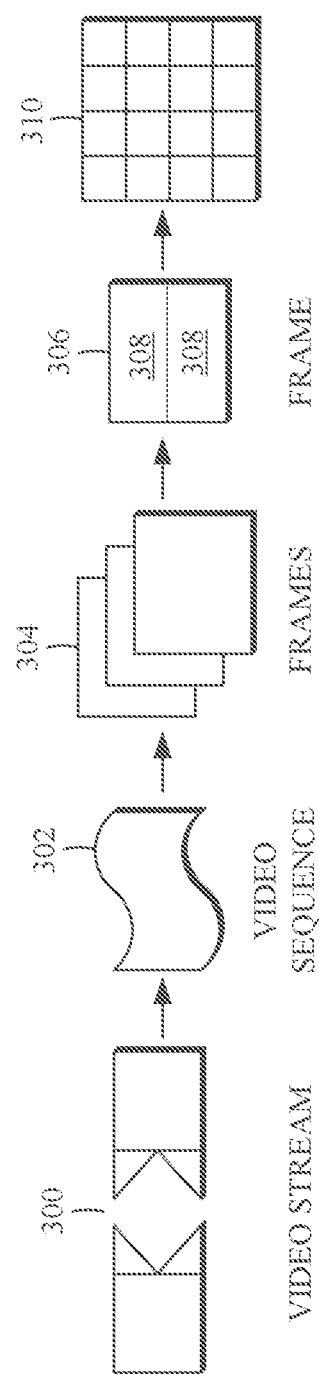
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macro-block are used interchangeably herein.

Figure 4:
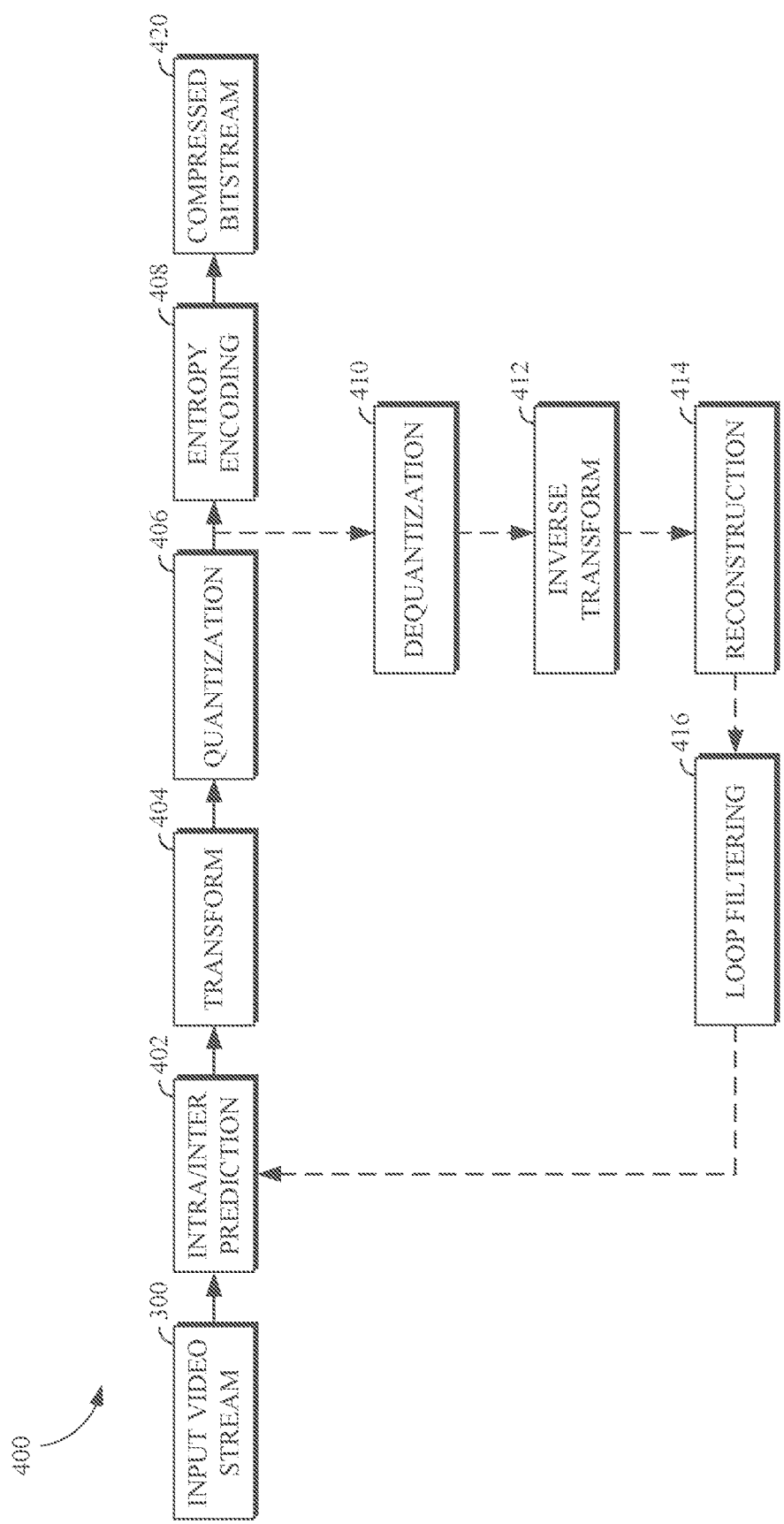
FIG. 4 is a block diagram of an encoder.

FIG. 4 is a block diagram of an encoder 400. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
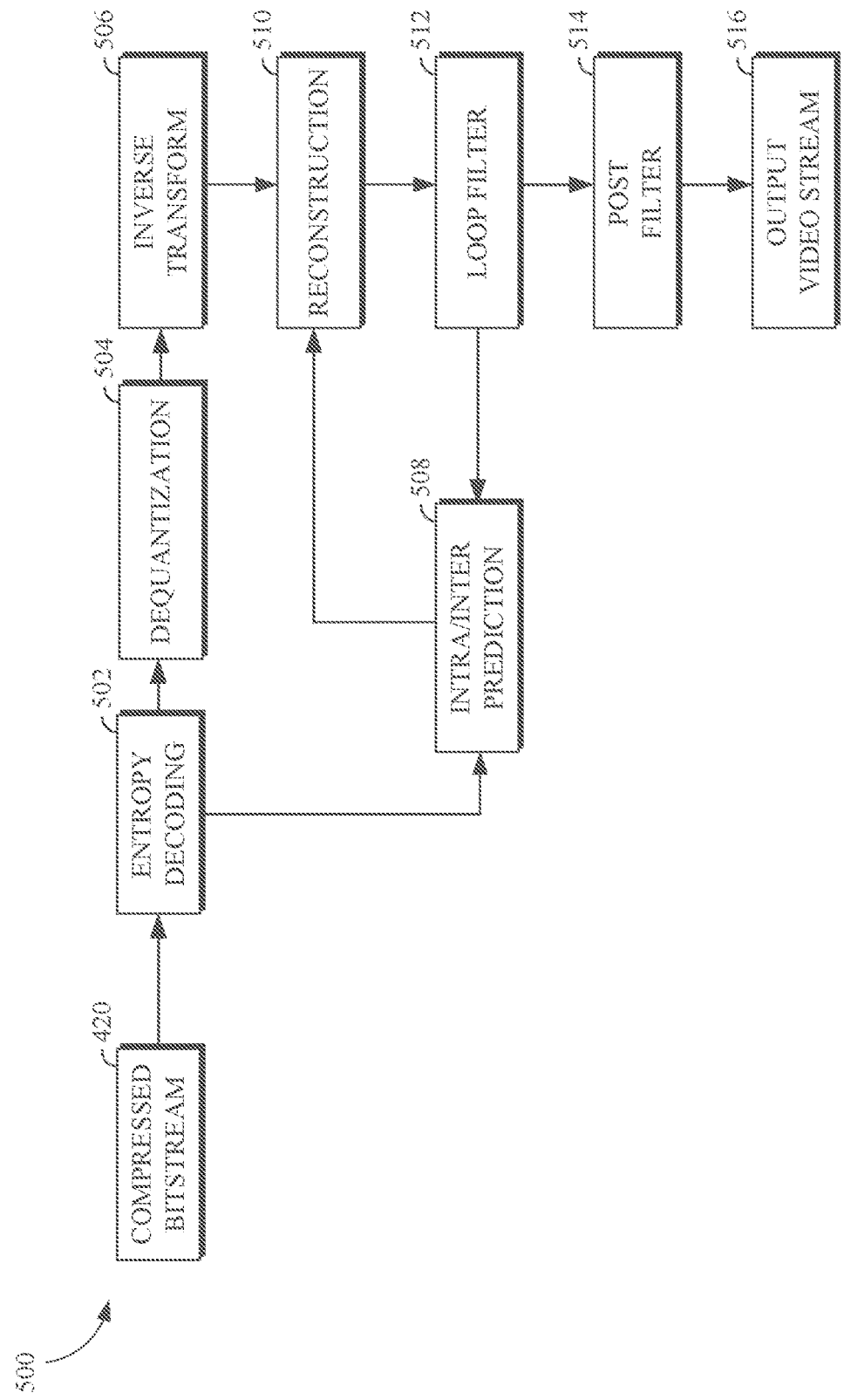
FIG. 5 is a block diagram of a decoder.

FIG. 5 is a block diagram of a decoder 500. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post-loop filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post-loop filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post-loop filtering stage 514.

Figure 6:
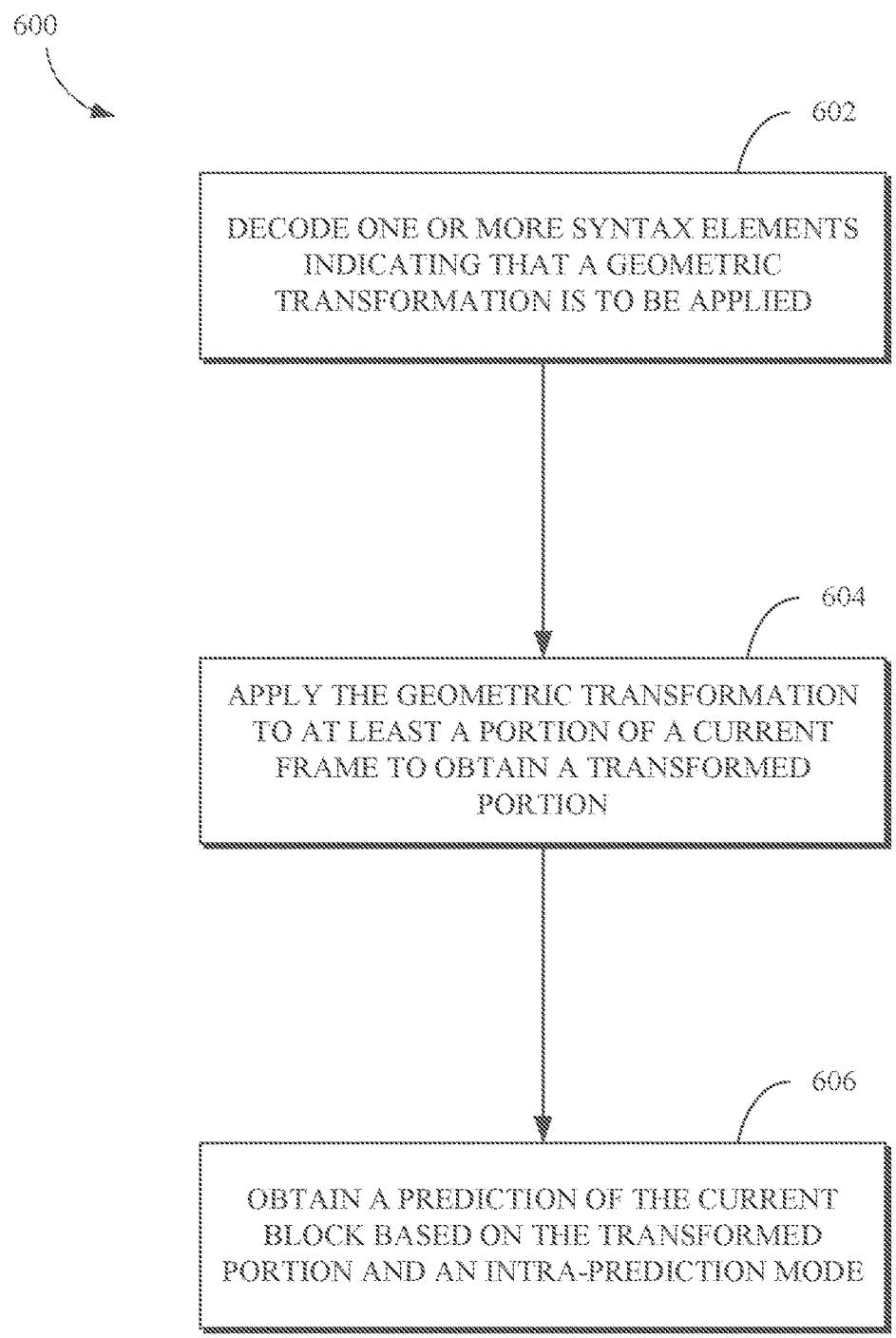
FIG. 6 is a flowchart of an example of a technique for predicting a current block of a current frame.

FIG. 6 is a flowchart of an example of a technique 600 for predicting a current block of a current frame. The technique 600 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 600. The technique 600 may be implemented in whole or in part in the intra/inter prediction stage 508 of the decoder 500. The technique 600 can be implemented using specialized hardware or firmware. Multiple processors, memories, or both, may be used.

At 602, one or more syntax elements indicating that a geometric transformation is to be applied is decoded from a compressed bitstream, such as the compressed bitstream 420 of FIG. 5. The one or more syntax elements indicate that the geometric transformation is to be applied to at least a portion of the current frame.

The one or more syntax elements may be decoded from a header of a group of blocks. The group of blocks can be all of the blocks of the current frame. That is, the geometric transformation is to be applied to the frame as a whole. As such, the one or more syntax elements can be decoded from a header of the current frame. The group of blocks can be a tile of current frame. As such, the one or more syntax elements can be decoded from a header associated with the tile. As is known, a tile can be a rectangular region within the current frame that includes a group of blocks and can be independently decoded from other tiles of the current frame. The group of blocks can be a superblock (e.g., a macroblock or a largest coding unit). A superblock can be a largest possible partition, which may be further partitioned in sub-blocks. A superblock can have a size of 64×64, 128×128 luma pixels, or some other size.

In an example, the one or more syntax elements may indicate that a horizontal reflection is to be applied. In an example, the one or more syntax elements may indicate that a vertical reflection is to be applied. In an example, the one or more syntax elements may indicate that a 90° rotation is to be applied. In an example, the one or more syntax element may indicate that a −90° rotation is to be applied. In an example, the one or more syntax element may indicate that a rotation is to be applied and may also include (e.g., indicate) the degrees of the rotation.

In an example, the decoder may include a codebook of geometric transformations and the one or more syntax elements can indicate which of the geometric transformations is to be applied. In an example, a geometric transformation may be according to an affine model. Affine transformation is a linear transform between the coordinates of two spaces that is determined by six affine coefficients. While the affine transformation may include translational motion, it can also encompass scaling, rotation and shearing. Therefore, an affine motion model is able to capture more complex motion than the conventional translational model. The affine transformation model can project a pixel at (x, y) of the current block to a prediction pixel at (x', y') in a reference frame through formula (1). In formula (1), the tuple (c, f) corresponds to a translational action; the parameters a and e can be used to control the scaling factors in the vertical and horizontal axes, and in conjunction with the parameters b and d decide (e.g., determine, set, etc.) a rotation angle.

$$\begin{bmatrix} x' \\ y' \end{bmatrix} = \begin{bmatrix} a & b & c \\ d & e & f \end{bmatrix} \begin{bmatrix} x \\ y \\ 1 \end{bmatrix} \quad (1)$$

In an example, entries in the codebook may correspond to different models. That is, different pre-defined parameter values may be associated with different entries in the codebook. In an example, model parameters may be obtained from the compressed bitstream. That is, an encoder may encode, and the technique 600 may decode, the model parameters from the compressed bitstream. As such, the one or more syntax elements can include the model parameters.

In an example, the one or more syntax elements can indicate that a line straightening geometric transformation is to be applied. The current frame may be a part of a video sequence. Metadata associated with the video sequence may indicate a device (or camera lens) used to obtain (e.g., record) the video sequence. A distortion model may be associated with or is known for the device. As such, based on the one or more syntax elements, the technique 600 can identify a line straightening model to apply based on the metadata. In another example, several line straightening models may be available and the one or more syntax elements can indicate the particular line straightening model to be applied.

At 604, the geometric transformation is applied to the at least the portion of the current frame to obtain a transformed portion. With respect to any geometric transformation, other than a line straightening operation, an effect of the transformation is the change in the order of decoding of the blocks. Another effect of the geometric transformation is making available different reference pixels, that would otherwise be unavailable, for obtaining predictions. At 606, a prediction of the current block is obtained based on the transformed portion and an intra-prediction mode. The intra-prediction mode can also be decoded from the compressed bitstream and may also be indicated by the one or more syntax elements.

In an example, the geometric transformation can be or include a horizontal reflection and the at least the portion of the current frame comprises at least one above neighboring block of the current block. In an example, the geometric transformation can be or include a vertical reflection and the at least the portion of the current frame comprises at least one left neighboring block of the current block. In an example, the geometric transformation can be or include a line-straightening transformation. The line-straightening transformation can be based on a distortion model. In an example, an indicator (e.g., an index) of the distortion model can be decoded from the compressed bitstream. In an example, the geometric transformation can be or include a rotation operation.

Figure 7:
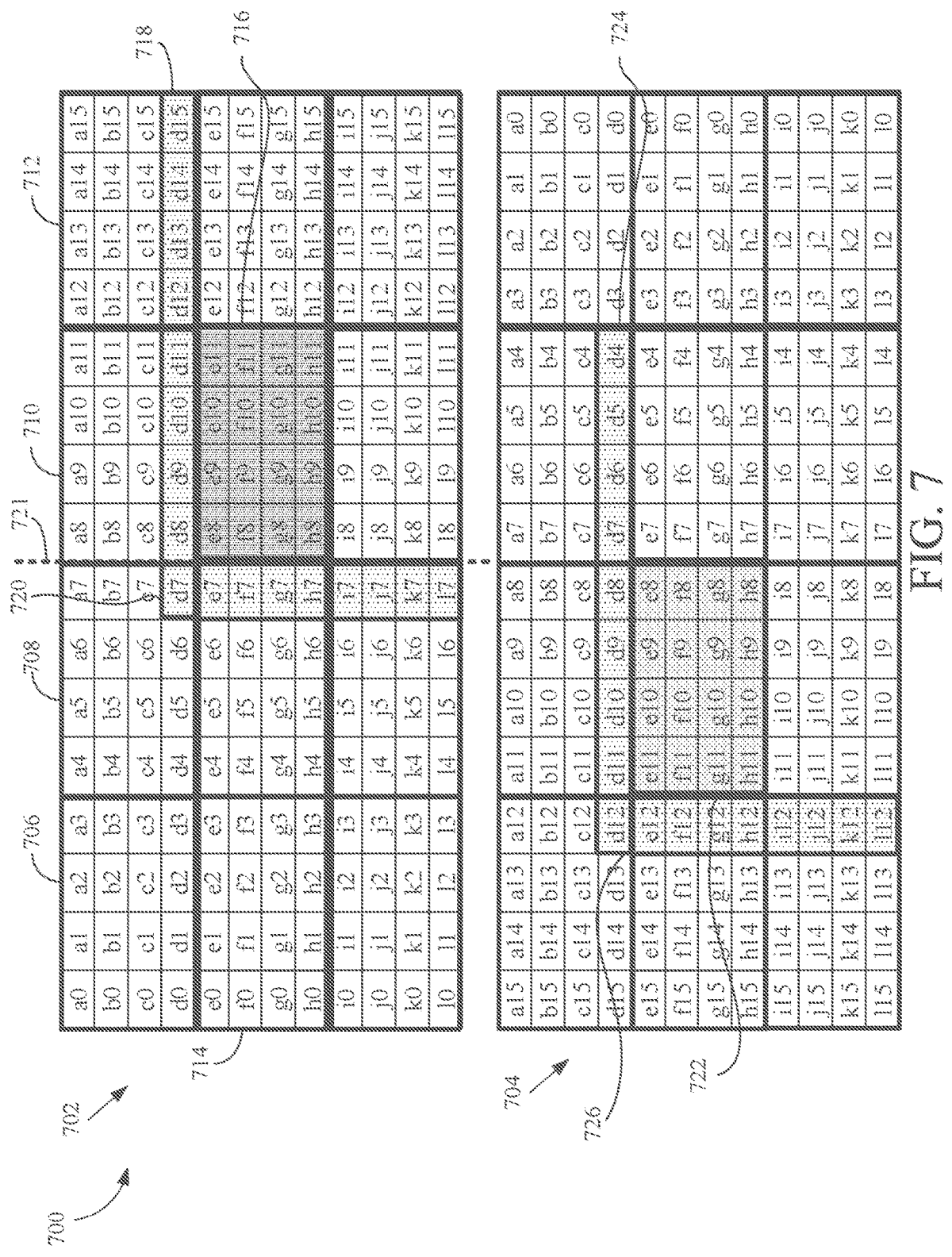

FIG. 7 is an illustration 700 of using a geometric transformation to obtain a prediction of a block. The illustration 700 includes a current block 702, which is transformed into a transformed portion 704 prior to a prediction operations, as further described herein. The current block 702 may be a superblock, which may be further partitioned into sub-blocks that may each be separately predicted. The current block 702 is illustrated as being of a size 16×12. However, the disclosure is not so limited and the current block 702 can have other sizes. As described above, the current block 702 can be part of a current frame or a current tile, to which the geometric transformation can be applied.

For simplicity of explanation, the current block 702 is illustrated a being partitioned into 4×4 blocks. However, and as can be appreciated, the current block 702 can be partitioned differently. The partitioning (e.g., the sub-blocks and their respective sizes) of the current block 702 can be decoded from a compressed bitstream, such as the compressed bitstream 420 of FIG. 5. FIG. 7 shows that the sub-blocks of the current block 702 include, among other sub-blocks, sub-blocks 706, 708, 710, 712, 714, and 716.

The sub-blocks of the current block 702 are traditionally decoded in raster scan order: from right to left and top to bottom. The sub-block 716 is illustrated as being decoded using an intra-prediction mode (not shown). As is known, predicting a block using intra-prediction can mean that peripherals pixels of the block are used to obtain a prediction block. Thus, with respect to the sub-block 716, a row of pixels 718 above the sub-block 716 and a column of pixels 720 to the left of the sub-block 716 are used to obtain the prediction block. As illustrated in FIG. 7, the sub-block 716 can be predicted using at least a subset of pixels located at $d_7$ to $d_{15}$ and $e_7$ to $l_7$. It is noted though, given the partitioning illustrated in FIG. 7, that the pixels $i_7$ to $l_7$ would not in fact be available since they belong to a sub-block that is not decoded before the sub-block 716.

By applying a horizontal reflection geometric transformation to the current block 702 prior to prediction, different reference pixels become available for predicting the pixels of sub-block 716 since the order of coding the sub-blocks changes. The current block 702 is horizontally reflected about a line 721. The line 721 is shown as halving the portion to which the geometric transformation is to be applied. However, that need not be the case. In an example, the location of the reflection line may be obtained based on the one or more syntax elements (described with respect to FIG. 6) decoded from the compressed bitstream. That is, the one or more syntax elements can include an indication of the location of the reflection line.

The pixels of the sub-block 716 are now in a sub-block 722 of the transformed portion 704; and a row of pixels 724 above the sub-block 722 and a column of pixels 726 to the left of the sub-block 722 are used to obtain the prediction block for the sub-block 722. Thus, and as illustrated in FIG. 7, the sub-block 722 can be predicted using at least a subset of pixels that were in the current block 702 located at $d_{12}$ down to $d_4$ and $e_{12}$ to $l_{12}$. As such, different reference prediction pixels are available if a geometric transformation is applied prior to prediction. It is noted though, given the partitioning illustrated in FIG. 7, that the pixels $i_{12}$ to $l_{12}$ would not in fact be available since they belong to a sub-block that is not decoded before the current block.

While no specific illustrations of other geometric transformations are shown, as a person skilled in the art would appreciate, similar effects can be obtained by applying different geometric operations.

Figure 8:
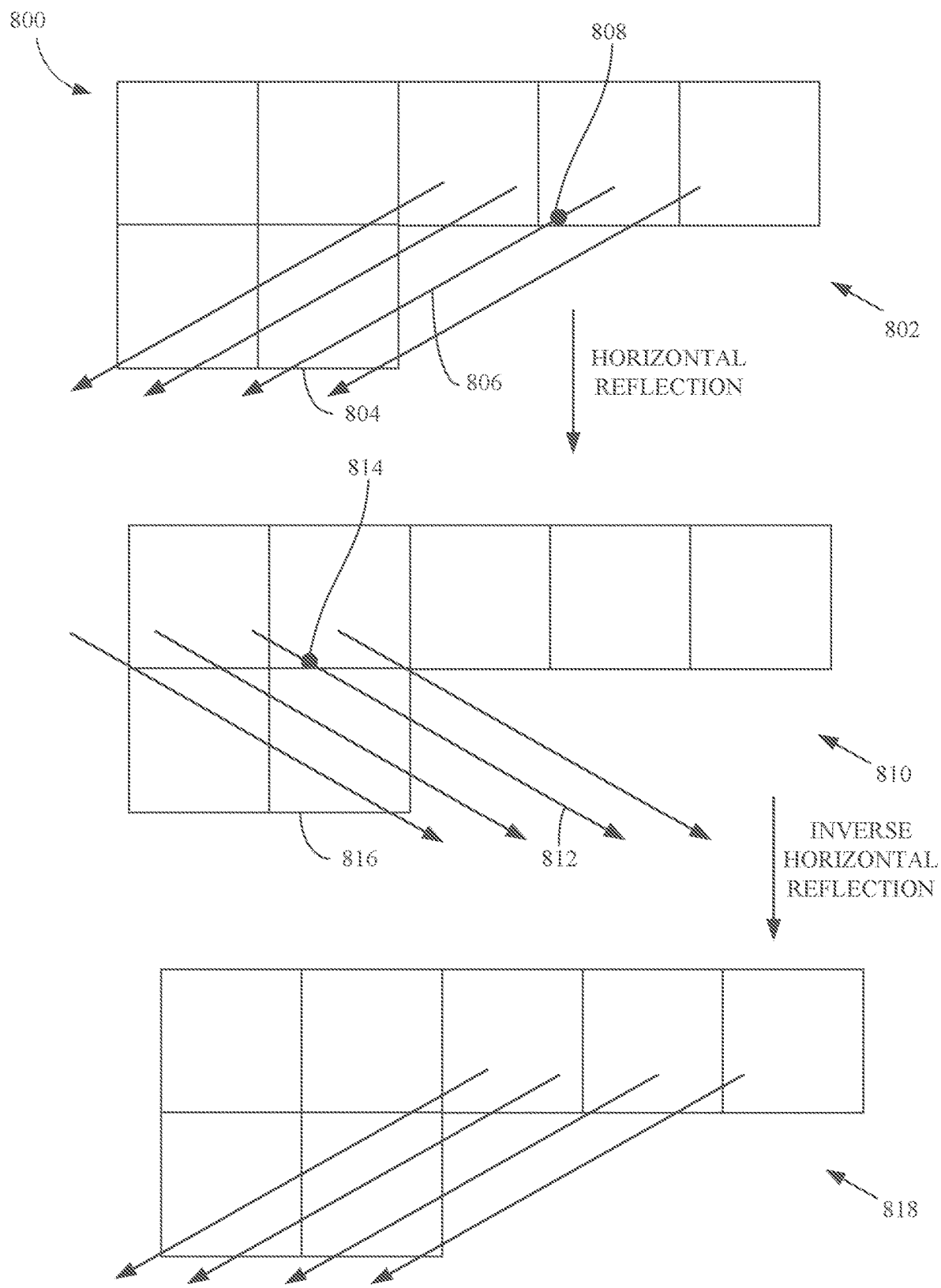
FIG. 8 is another illustration of a applying a geometric transformation prior to prediction.

FIG. 8 is another illustration 800 of a applying a geometric transformation prior to prediction. The geometric transformation illustrated in FIG. 8 is a horizontal reflection. The illustration 800 includes a portion 802 of a current frame (not shown). The current frame, or a portion thereof that includes a current block 804, may exhibit a pattern that would necessitate or result in the use of an intra-prediction mode having a prediction direction along a direction 806. As such, the intra-prediction mode would use reference pixels, including a reference pixel 808 that is too far from the current block 804. However, in an example, the available intra-prediction modes may not include any intra-prediction modes that would in fact make use of reference pixels that are that distant from the current block.

A geometric transformation (in this case a horizontal transformation) is applied to at least the portion 802 to obtain a transformed portion 810. The geometric transformation results and the transformation of the prediction direction, as illustrated by the transformed prediction direction 812. The location of the reference pixel 808 changes to a location 814. As such, the reference pixel at the location 814 can be used to obtain a prediction block for a current block 816.

Subsequent to the prediction phase, such as after the reconstruction phase, an inverse of the geometric transformation (e.g., in this case, an inverse horizontal transformation) is then applied to obtain the reconstructed portion 818.

Figure 9:
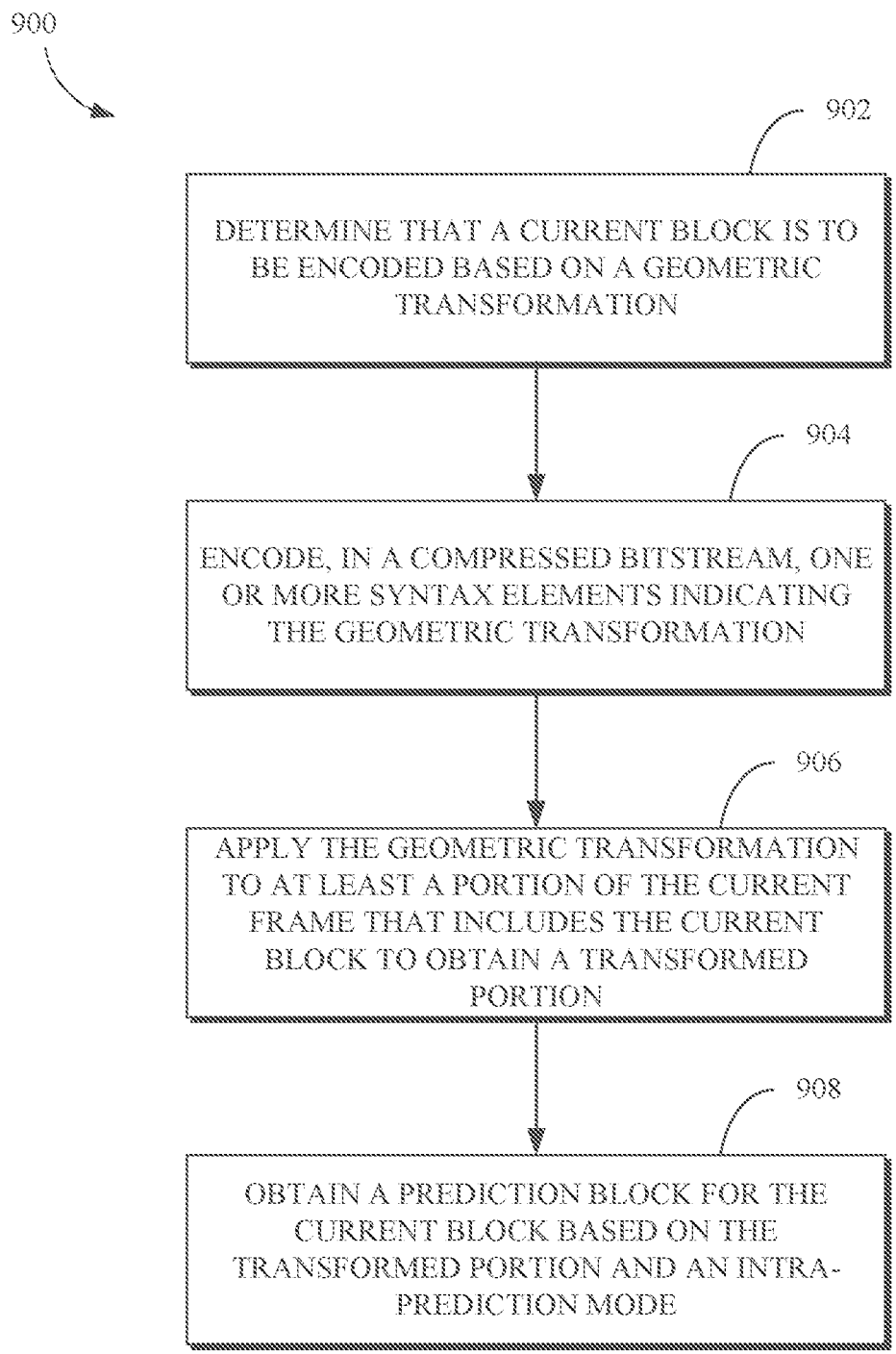
FIG. 9 is a flowchart of an example of a technique for encoding a current block of a current frame using a geometric transformation.

FIG. 9 is a flowchart of an example of a technique 900 for encoding a current block of a current frame using a geometric transformation. The technique 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 900. The technique 900 may be implemented in whole or in part in the intra/inter prediction stage 402 of the encoder 400 of FIG. 4. The technique 900 can be implemented using specialized hardware or firmware. Multiple processors, memories, or both, may be used.

At 902, it is determined that the current block of the current frame is to be encoded based on a geometric transformation. For example, the encoder may determine rate-distortion values associated with different prediction modes. The prediction modes can include those that include and/or are performed after different geometric transformations are applied. To illustrate, in an example, the encoder may obtain respective rate-distortion values associated with available intra-prediction modes. The encoder may then, for each of available geometric transformations, apply a geometric transformation and then obtain respective rate-distortion values associated with available intra-prediction modes. In an example, the optimal rate-distortion value may correspond to a combination of the geometric transformation and an intra-prediction mode.

At 904, one or more syntax elements indicating the geometric transformation may be encoded in a compressed bitstream, such as the compressed bitstream 420 of FIG. 4. At 906, the geometric transformation is applied to at least a portion of the current frame that includes the current block to obtain a transformed portion. In an example, the geometric transformation may be applied as part of or prior to determining that the current block is to be encoded based on a geometric transformation, at 902.

At 908, a prediction block for the current block is obtained based on the transformed portion and an intra-prediction mode (e.g., a chosen intra-prediction mode).

Figure 10:
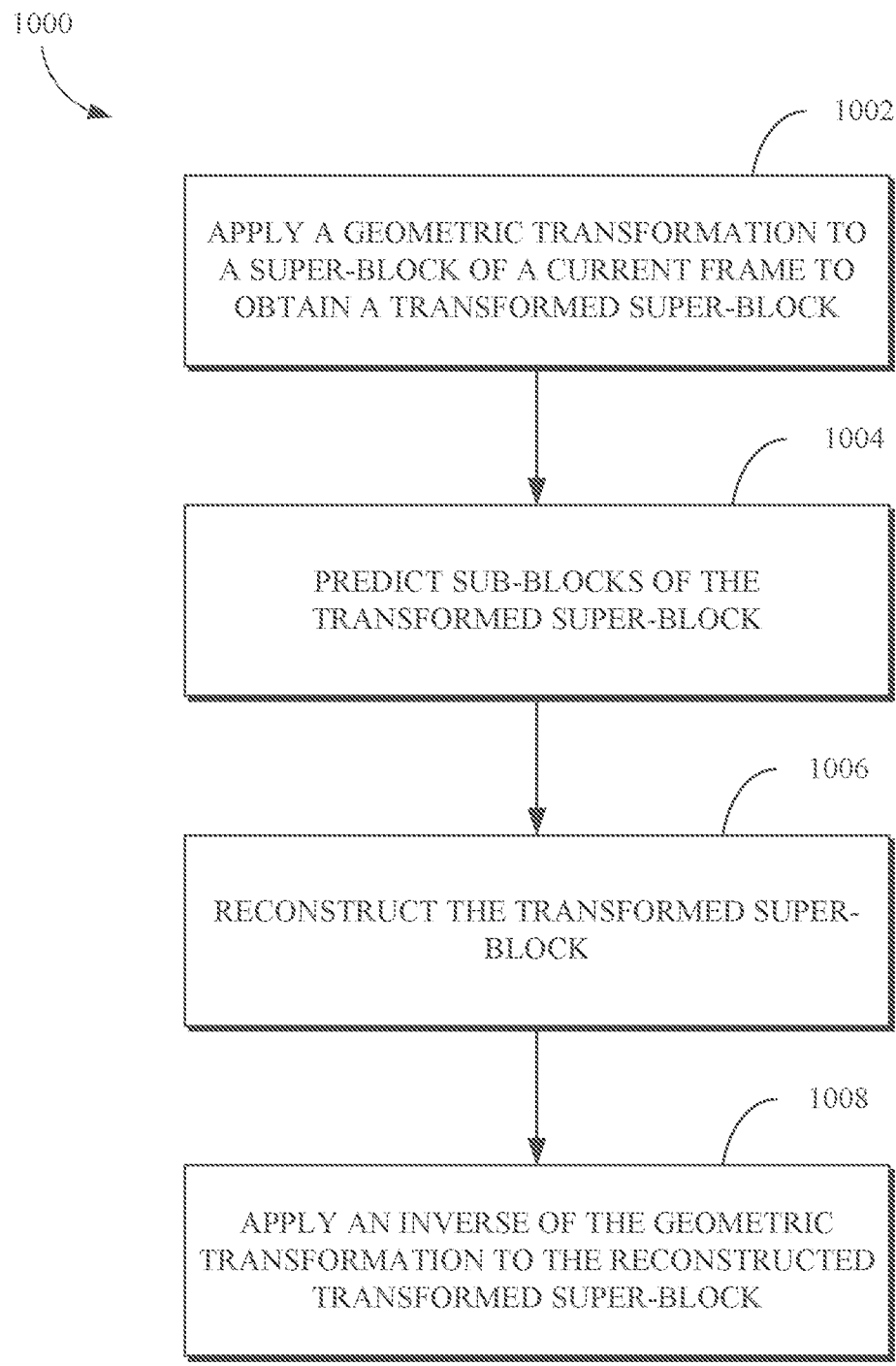
FIG. 10 is a flowchart of an example of a technique for encoding a super-block of a current frame.

FIG. 10 is a flowchart of an example of a technique 1000 for encoding a super-block of a current frame. The technique 1000 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 1000. The technique 1000 may be implemented in whole or in part by the encoder 400 of FIG. 4. The technique 1000 can be implemented using specialized hardware or firmware. Multiple processors, memories, or both, may be used.

At 1002, a geometric transformation is applied to a super-block of a current frame to obtain a transformed super-block. At 1004, sub-blocks of the transformed super-block are predicted. In an example, each of the sub-blocks may be predicted using a respective intra-prediction mode. At 1006, the transformed super-block is reconstructed. At 1008, an inverse of the geometric transformation is applied to the reconstructed transformed super-block to obtain a reconstruction of the super-block.

For simplicity of explanation, the techniques described herein, such as the techniques 600 and 900 of FIGS. 6 and 9, respectively, are each depicted and described as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The disclosure presented herein may be considered in view of the following aspects.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One first general aspect includes a method for decoding a current block of a current frame. The method includes decoding, from a compressed bitstream, one or more syntax elements indicating that a geometric transformation is to be applied. The method also includes applying the geometric transformation to at least a portion of the current frame to obtain a transformed portion. The method also includes obtaining a prediction of the current block based on the transformed portion and an intra-prediction mode.

Another second general aspect includes a method for encoding a current block of a current frame. The method includes determining that the current block is to be encoded based on a geometric transformation. The method also includes encoding, in a compressed bitstream, one or more syntax elements indicating the geometric transformation. The method also includes applying the geometric transformation to at least a portion of the current frame that includes the current block to obtain a transformed portion. The method also includes obtaining a prediction block for the current block based on the transformed portion and an intra-prediction mode. Other embodiments of this aspect include corresponding computer systems, apparatus, and computer programs recorded on one or more computer storage devices, each configured to perform the actions of the methods.

Another third general includes a method. The method includes applying a geometric transformation to a super-block of a current frame to obtain a transformed super-block; predicting sub-blocks of the transformed super-block, reconstructing the transformed super-block, and applying an inverse of the geometric transformation to the reconstructed transformed super-block to obtain a reconstruction of the super-block. Other embodiments of this aspect include corresponding computer systems, apparatus, and computer programs recorded on one or more computer storage devices, each configured to perform the actions of the methods.

Other embodiments of these aspects include corresponding computer systems, apparatuses, and computer programs recorded on one or more computer storage devices, each configured to perform the actions of the methods.

Implementations may include one or more of the following features. The geometric transformation may be a horizontal reflection and the at least the portion of the current frame may include a neighboring block that is above the current block. The geometric transformation may be a vertical reflection and the at least the portion of the current frame may include a neighboring block that is left of the current block. The geometric transformation may include a line-straightening transformation. The line-straightening transformation may be based on a distortion model. An indicator of the distortion model may be included in (e.g., encoded in or decoded from) the compressed bitstream. The geometric transformation may include a rotation operation. The at least the portion of the current frame may include a tile of the current frame. The current frame constitutes the at least the portion of the current frame. Implementations of the described techniques may include hardware, a method or process, or computer software on a computer-accessible medium.

Another general aspect is a non-transitory computer-readable storage medium having stored thereon a compressed bitstream that is configured for decoding by a decoder performing the first general aspect or the third general aspect.

Another general aspect is a non-transitory computer-readable storage medium having stored thereon a compressed bitstream that is generated by an encoder performing the second general aspect or the third general aspect.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a current block of a current frame comprising:
    decoding, from a compressed bitstream, one or more syntax elements indicating that a geometric transformation is to be applied to at least a portion of the current frame for intra-prediction purposes, wherein the geometric transformation operates in a pixel domain and produces a result in the pixel domain;
    applying the geometric transformation to at least a portion of the current frame to obtain a transformed portion within the current frame; and
    obtaining a prediction of the current block based on the transformed portion and an intra-prediction mode using reference pixels from the transformed portion of the current frame.

2. The method of claim 1, wherein the geometric transformation is a horizontal reflection and the at least the portion of the current frame comprises a neighboring block that is above the current block.

3. The method of claim 1, wherein the geometric transformation is a vertical reflection and the at least the portion of the current frame comprises a neighboring block that is left of the current block.

4. The method of claim 1, wherein the geometric transformation comprises a line-straightening transformation.

5. The method of claim 4, wherein the line-straightening transformation is based on a distortion model.

6. The method of claim 5, wherein an indicator of the distortion model is decoded from the compressed bitstream.

7. The method of claim 1, wherein the geometric transformation comprises a rotation operation.

8. The method of claim 1, wherein the at least the portion of the current frame comprises a tile of the current frame.

9. A method for encoding a current block of a current frame comprising:
    determining that the current block is to be encoded based on a geometric transformation to be applied to at least a portion of the current frame for intra-prediction purposes, wherein the geometric transformation operates in a pixel domain and produces a result in the pixel domain;
    encoding, in a compressed bitstream, one or more syntax elements indicating the geometric transformation;
    applying the geometric transformation to at least a portion of the current frame that includes the current block to obtain a transformed portion within the current frame; and
    obtaining a prediction block for the current block based on the transformed portion and an intra-prediction mode using reference pixels from the transformed portion of the current frame.

10. The method of claim 9, wherein the geometric transformation is a horizontal reflection and the at least the portion of the current frame comprises a neighboring block that is above the current block.

11. The method of claim 9, wherein the geometric transformation is a vertical reflection and the at least the portion of the current frame comprises a neighboring block that is left of the current block.

12. The method of claim 9, wherein the geometric transformation comprises a line-straightening transformation.

13. The method of claim 12, wherein the line-straightening transformation is based on a distortion model.

14. The method of claim 9, wherein the geometric transformation comprises a rotation operation.

15. The method of claim 9, wherein the at least the portion of the current frame comprises a tile of the current frame.

16. A device, comprising:
    a processor, the processor configured to execute instructions to code a current block of a current frame, the instructions comprise to:
        code one or more syntax elements indicating that a geometric transformation is to be applied to at least a portion of the current frame for intra-prediction purposes, wherein the geometric transformation operates in a pixel domain and produces a result in the pixel domain;
        apply the geometric transformation to at least a portion of the current frame to obtain a transformed portion within the current frame; and obtain a prediction of the current block based on the transformed portion and an intra-prediction mode using reference pixels from the transformed portion of the current frame.

17. The device of claim 16, wherein the geometric transformation comprises at least one of a horizontal, a vertical reflection, or a line-straightening transformation.

18. The device of claim 16, wherein the geometric transformation comprises a rotation operation.

19. The device of claim 16, wherein the geometric transformation is a horizontal reflection and the at least the portion of the current frame comprises a neighboring block that is above the current block.

20. The device of claim 16, wherein the geometric transformation is a vertical reflection and the at least the portion of the current frame comprises a neighboring block that is left of the current block.

* * * * *